United States Patent
Kawaguchi

(10) Patent No.: US 11,775,237 B2
(45) Date of Patent: Oct. 3, 2023

(54) DISPLAY DEVICE CAPABLE OF DISPLAYING PREVIEW IMAGE

(71) Applicant: KYOCERA Document Solutions Inc., Osaka (JP)

(72) Inventor: Shinichi Kawaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 150 days.

(21) Appl. No.: 17/433,750

(22) PCT Filed: Jan. 22, 2020

(86) PCT No.: PCT/JP2020/002156
§ 371 (c)(1),
(2) Date: Aug. 25, 2021

(87) PCT Pub. No.: WO2020/174944
PCT Pub. Date: Sep. 3, 2020

(65) Prior Publication Data
US 2022/0137900 A1    May 5, 2022

(30) Foreign Application Priority Data
Feb. 26, 2019    (JP) .................................. 2019-032767

(51) Int. Cl.
*G06F 3/12* (2006.01)
*H04N 1/00* (2006.01)

(52) U.S. Cl.
CPC .......... *G06F 3/1256* (2013.01); *G06F 3/1208* (2013.01); *H04N 1/00453* (2013.01)

(58) Field of Classification Search
CPC ... G06F 3/1256; G06F 3/1208; H04N 1/0044; H04N 1/00442; H04N 1/00453
USPC ........................................................ 358/1.15
See application file for complete search history.

(56) References Cited

U.S. PATENT DOCUMENTS

| | | | |
|---|---|---|---|
| 8,453,054 B2 * | 5/2013 | Mizoguchi | G06F 3/1256 715/273 |
| 9,158,492 B2 | 10/2015 | Miyata | |
| 2009/0265625 A1 * | 10/2009 | Tamai | H04N 1/00442 358/1.15 |
| 2012/0092690 A1 | 4/2012 | Saito | |
| 2014/0146330 A1 | 5/2014 | Miyata | |
| 2018/0275933 A1 * | 9/2018 | Fujimoto | G06F 3/1256 |

FOREIGN PATENT DOCUMENTS

| | | |
|---|---|---|
| JP | H10-301742 A | 11/1998 |
| JP | 2012-81757 A | 4/2012 |
| JP | 2014-106753 A | 6/2014 |

* cited by examiner

*Primary Examiner* — Kent Yip
(74) *Attorney, Agent, or Firm* — Studebaker & Brackett PC

(57) ABSTRACT

A display device (1) includes a receiving section (11), a generating section (12), and a display section (40). The receiving section (11) receives an arrangement setting that is a setting by which a page image P is arranged in formation of the page image P on a sheet. The generating section (12) generates based on the arrangement setting a preview image (AP) in which an identification image D identifying the page image P is disposed. The display section (40) displays the preview image (AP). A location of the identification image D in the preview image (AP) indicates a location of the page image P when the page image P is formed on the sheet. The identification image D has a data size smaller than a data size of the page image P.

6 Claims, 12 Drawing Sheets

DISPLAY DEVICE CAPABLE OF DISPLAYING PREVIEW IMAGE

TECHNICAL FIELD

The present invention relates to a display device.

BACKGROUND ART

In the printing setting device disclosed in Patent Literature 1, an interface receives information on printing settings (e.g., a setting of the number of copies, a setting to select monochrome printing or color printing, a setting of either of both stapling and perforation, a setting of duplex printing, and a setting of simplex printing) from a user. A setting screen displayed on the interface includes a printed image preview display area and a read image display area. A list of read images that are printing target images which are reduced in size is displayed in the read image display area.

CITATION LIST

Patent Literature

[Patent Literature 1] Japanese Patent Application Laid-Open Publication No. 2012-81757

SUMMARY OF INVENTION

Technical Problem

However, the printing setting device disclosed in Patent Literature 1 causes the printing target images which are reduced in size to be displayed in the read image display area of the setting screen, therefore time is needed to display the setting screen.

The present invention has been made in view of the foregoing and has its object of providing a display device that allows quick checking of the arrangement of a page image to be formed on a sheet.

Solution to Problem

According to an aspect of the present invention, a display device includes a receiving section, generating section, and a display section. The receiving section receives an arrangement setting that is a setting by which a page image is arranged in formation of the page image on a sheet. The generating section generates based on the arrangement setting a preview image in which an identification image identifying the page image is arranged. The display section displays the preview image. A location of the identification image in the preview image indicates a location of the page image when the page image is formed on the sheet. The identification image has a data size smaller than a data size of the page image.

Advantageous Effects of Invention

According to the present invention, the arrangement of a page image to be formed on a sheet can be checked quickly.

DESCRIPTION OF EMBODIMENTS

Figure 1:
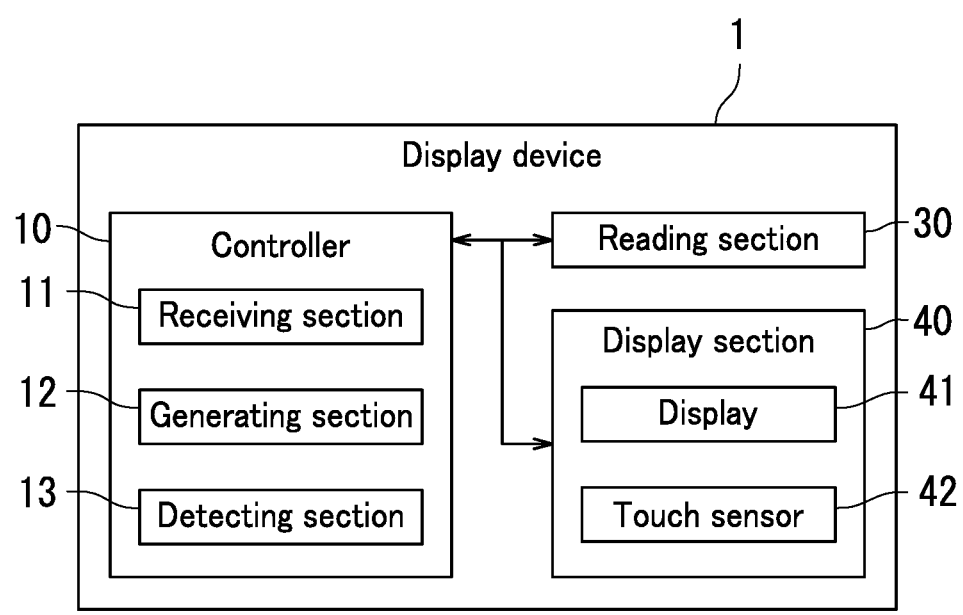
FIG. 1 is a diagram illustrating a display device according to a first embodiment of the present invention.

The following describes embodiments of the present invention with reference to the accompanying drawings. However, the present invention is in no way limited to the following embodiments. Elements that are the same or equivalent are indicated by the same reference signs in the drawings and description thereof is not repeated.

First Embodiment

Description will be made first of a display device 1 according to a first embodiment with reference to FIG. 1. FIG. 1 is a diagram illustrating the display device 1. The display device 1 includes a controller 10, a reading section 30, and a display section 40. The display device 1 may be any of an image forming apparatus, a personal computer, a smartphone, and a printer, for example. Alternatively, the display device 1 may be embedded in any of an image forming apparatus, a personal computer, a smartphone, and a printer, for example.

The controller 10 includes a processor and storage. The processor includes a central processing unit (CPU) or a microprocessing unit (MPU), for example. The storage includes memory such as semiconductor memory and may include a hard disk drive (HDD). The storage stores computer programs therein. The controller 10 controls each element of the display device 1. Specifically, the controller 10 executes the computer programs stored in the storage to control the reading section 30 and the display section 40. Furthermore, the controller 10 executes the computer programs stored in the storage to function as a receiving section 11, a generating section 12, and a detecting section 13. That is, the controller 10 includes the receiving section 11, the generating section 12, and the detecting section 13. The receiving section 11, the generating section 12, and the detecting section 13 will be described later in detail.

The reading section 30 reads an image of a sheet. For example, the reading section 30 reads an image of a document sheet. The reading section 30 then generates a page image P. The page image P will be described later.

The display section 40 displays an image and receives an operation from a user. The display section 40 includes a display 41 and a touch sensor 42. The display 41 is a liquid-crystal panel or an organic electroluminescent (organic EL) panel, for example. The touch sensor 42 receives user operation and inputs an operation signal according to the user operation to the controller 10. The touch sensor 42 is disposed on a display screen of the display 41, for example.

Figure 2:
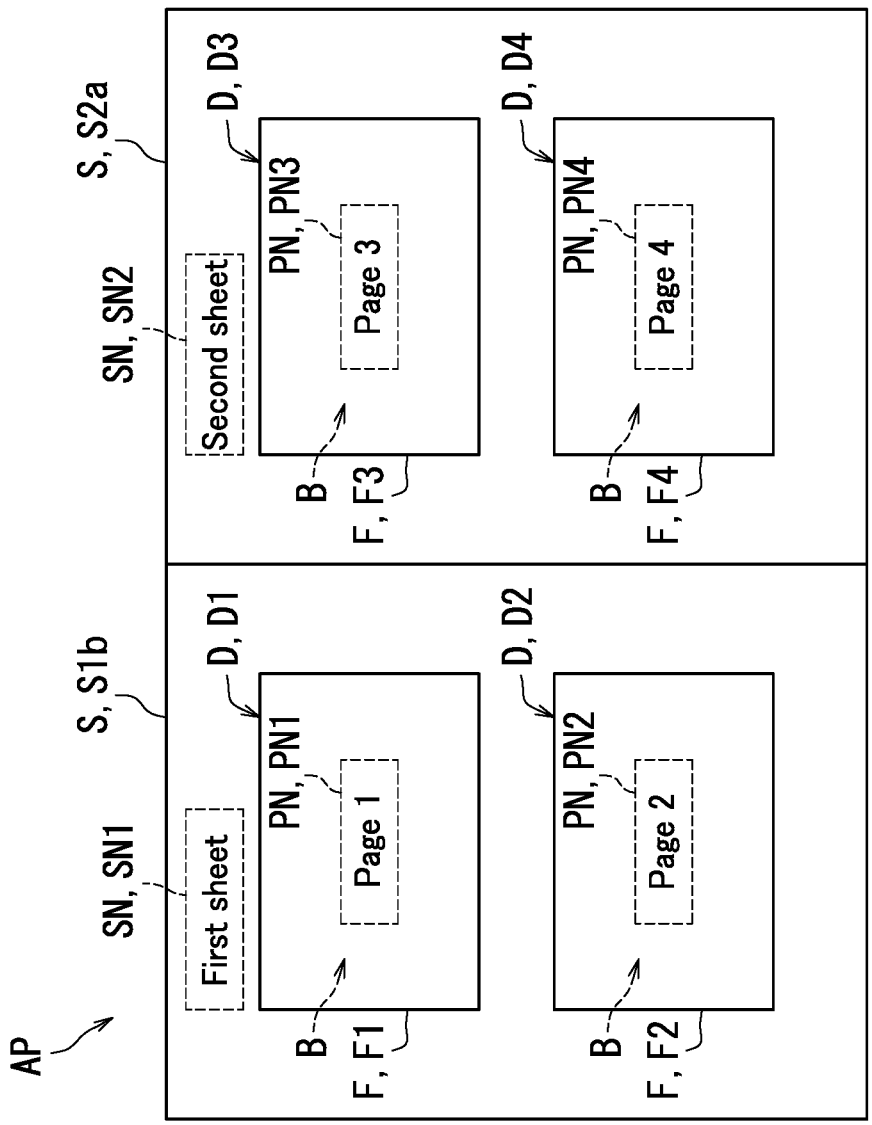
FIG. 2 is a diagram illustrating an example of a preview image generated by a generating section in the first embodiment.

With reference to FIG. 2, a preview image AP will be described next. FIG. 2 is a diagram illustrating an example of the preview image AP. First, the receiving section 11 receives from a user an arrangement setting by which a page image to be formed on a sheet is arranged. In the present embodiment, there are a plurality of page images. Furthermore, the receiving section 11 receives the arrangement setting which is a setting by which page images are arranged on each side of each sheet in the present embodiment. In addition, the receiving section 11 receives the arrangement setting which is a setting by which two page images are arranged on each side of the sheet. Moreover, the receiving section 11 receives the arrangement setting which is a setting by which the page images are arranged such that the sheet is turned with the long side among the short side and the long side of the sheet as an axis. In addition, the receiving section 11 receives the arrangement setting which is a setting by which the page images are arranged such that the sheet is turned to the left. That is, the receiving section 11 receives the arrangement setting which is a setting by which the page images are arranged such that the page number of a page image located right is greater than the page number of a page image located left in a case in which the sheets are turned into a spread. Further, the receiving section 11 receives the arrangement setting which is a setting by which the page images are arranged such that the page images are to be formed on the sheets with a cover added.

The generating section 12 generates a preview image AP indicating the arrangement of sheets with page images formed thereon based on the arrangement setting received by the receiving section 11. Then, the display section 40 displays the preview image AP generated by the generating section 12.

As illustrated in FIG. 2, the preview image AP includes sheet images S1$b$ and S2$a$, sheet number images SN1 and SN2, and identification images D1 to D4. The sheet images S1$b$ and S2$a$ each indicate a sheet with page images to be formed thereon. The sheet image S1$b$ corresponds to one of the sides of the first sheet of the sheets on which the page images are to be formed. Also, the sheet image S2$a$ corresponds to one of the sides of the second sheet of the sheets on which the page images are to be formed. Note that a sheet image S1$a$ corresponds to the other of the sides of the first sheet of the sheets on which page images are to be formed. Also, a sheet image S2$b$ corresponds to the other of the sides of the second sheet of the sheets on which page images are to be formed. In the present embodiment, the sheet images S1$a$ to SN$b$ will be generally referred to below as "sheet images S" where there is no need to distinguish the sheet images S1$a$ to SN$b$.

The sheet number images SN1 and SN2 indicate the sheet numbers of the corresponding sheets on which page images are to be formed. The sheet number image SN1 corresponds to the sheet number of the first sheet of the sheets on which the page images are to be formed. Also, the sheet number image SN2 corresponds to the sheet number of the second sheet of the sheets on which the page images are to be formed. In the following, the sheet number images SN1 to SNN will be generally referred to below as "sheet number images SN" where there is no need to distinguish the sheet number images SN1 to SNN.

The identification images D1 to D4 identify the corresponding page images. The identification image D1 corresponds to the first page image of the page images. Also, the identification image D2 corresponds to the second page image of the page images. Furthermore, the identification image D3 corresponds to the third page image of the page images. Moreover, the identification image D4 corresponds to the fourth page image of the page images. In the present embodiment, the identification images D1 to DN will be generally referred to below as "identification images D" where there is no need to distinguish the identification images D1 to DN.

The identification images D each have a data size smaller than the data size of the corresponding page images. Accordingly, a preview image AP including identification images D is displayed by the display section 40 quicker than a preview image AP including page images. As a result, the user can quickly check the arrangement of the page images to be formed on the sheets.

Each identification image D includes a main image B and a frame image F in the present embodiment. The main image B exhibits a page image to be actually formed on a sheet. The frame image F indicates a range (also referred to below as printing range) where the page image is actually formed on a sheet. That is, the frame image F is displayed on the boundary between the printing range and a range other than the printing range. However, the frame image F may match, substantially match, or differ from a corresponding page image in either or both shape and range. The frame image F is rectangular in shape, for example. Any of the size, shape, and location of the frame image F are changed for example according to an arrangement setting of the page image received from the user. However, the frame image F simply indicates on the preview image AP the printing range of a page image to be formed on a sheet, and functions as a fixed part displayed through routine processing. Note that in the preview image AP, the color of the main images B may be displayed so as to be differentiated from the color of a part other than the identification images D or the color density of the main images B may be displayed so as to be differentiated from the color density of the part other than the identification images D.

The main images B each include a corresponding one of page number images PN1 to PN4 that indicate the page numbers of the respective page images. That is, the identification images D include the corresponding page number images PN1 to PN4. The page number image PN1 corresponds to the page number of the first page image of the page images. Also, the page number image PN2 corresponds to the page number of the second page image of the page images. In addition, the page number image PN3 corresponds to the page number of the third page image of the page images. Furthermore, the page number image PN4 corresponds to the page number of the fourth page image of the page images. Accordingly, even when the preview image AP is displayed without including any page images, the user can check the order of the page images to be formed on the sheets by checking the page number images PN1 to PN4. As a result, it is easy for the user to check the arrangement of the page images.

Figure 5:
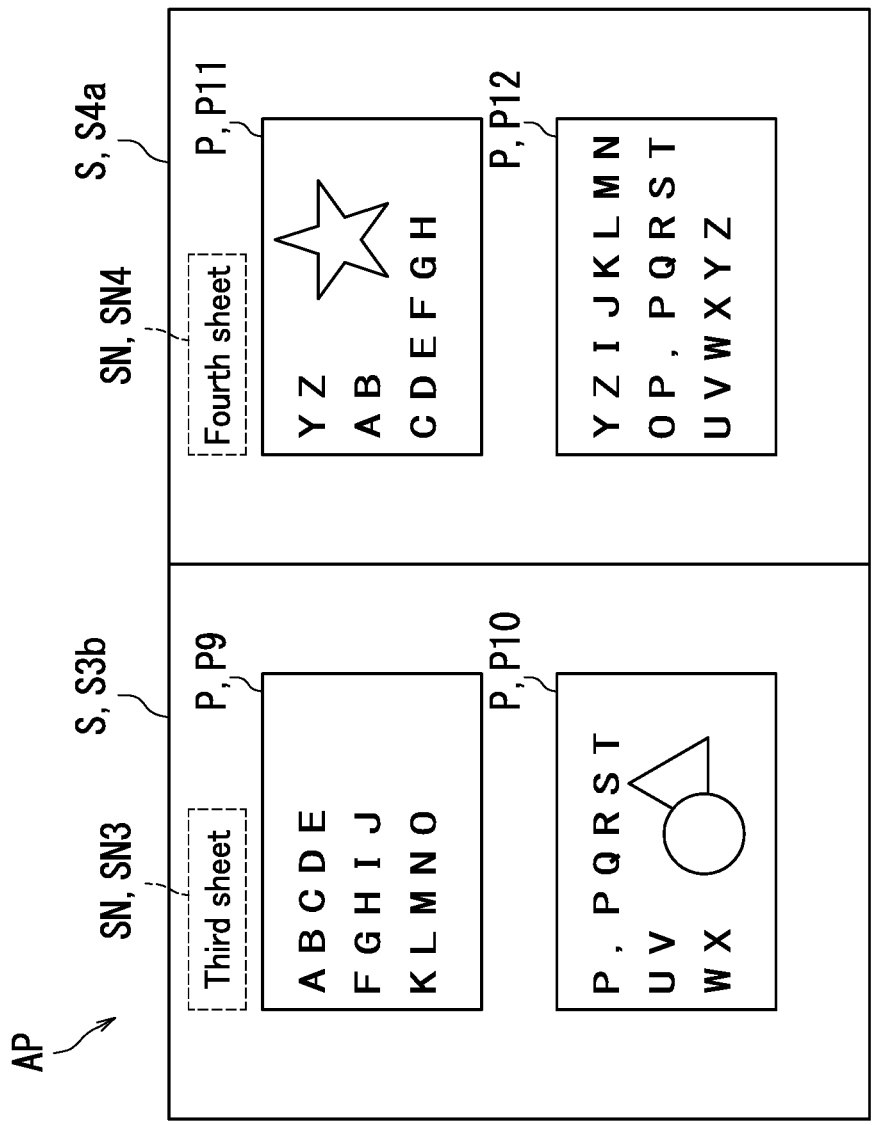
FIG. 5 illustrates the preview image in which identification images have been replaced by page images in the first embodiment.

As described above with reference to FIG. 2, the identification images D are images differing from reduced-size images that are page images reduced in size. In addition, the identification images D each have a data size smaller than the data size of the corresponding reduced-size images. Accordingly, the identification images D are displayed quicker than the reduced-size images in the display section 40 displaying the preview image AP. As a result, the user can surely and quickly check the arrangement of the page images to be formed on the sheets. Note that the page images P displayed in the preview image AP, which will be described later with reference to FIG. 5, are examples of the reduced-size images.

Here, the data size of each identification image D being smaller than the data size of the corresponding page image corresponds to at least one of conditions (i) and (ii) below.
(i) In the preview image AP, the usage of video random-access memory (VRAM) constituting the storage of the controller 10 is less when an identification image D is displayed in the printing range than when the reduced-size image of a page image is displayed in the printing range. This is because the main image B of the identification image D is displayed in a part of the printing range while the reduced-size image is displayed in the entirety of the printing range.
(ii) The usage of memory for storing an identification image D in the storage of the controller 10 is smaller than the usage of memory for storing a reduced-size image in the storage of the controller 10. Also, the usage of memory in displaying an identification image D in the printing range is smaller than the usage of memory in displaying a reduced-size image in the printing range. This is because in storing an identification image D in the storage, for example, the position coordinates for the segments of a frame image F, text information on the page number image PN included in a main image B, and color information of the text are stored in the storage, which reduces the usage of the memory. Also, this is because even in a case in which an identification image D is stored in the storage as image data such as bit-mapped data, the number of pixels constituting the image data of the identification image D is small, which reduces the usage of the memory.

That is, the usage of the VRAM by an identification image D or a main image B, or the usage of memory in storing or displaying an identification image D or a main image B is smaller than the data size of a page image stored in the display device 1. Note that in a case in which a page image includes particular data such as data with which nothing is formed on a sheet (blank sheet), the data size of a corresponding identification image D may be larger than the data size of the page image. However, the data sizes of almost all identification images D and the data sizes of almost all page images satisfy the conditions (i) and (ii) above.

The following describes switching of display contents of the preview image AP with reference to FIGS. 2 to 5. In page image formation on both sides of respective sheets, the display section 40 displays sheet images S different from the currently displayed sheet images S when the detecting section 13 detects an operation on the preview image AP. That is, when the detecting section 13 detects an operation on the preview image AP, the display section 40 displays identification images D differing from the currently displayed identification images D.

The operation on the preview image AP is a touch operation in which the preview image AP displayed on the display section 40 is touched, for example. The touch operation is an operation on the display section 40 such as a tap operation, a flick operation, a slide operation, a swipe operation, a pinch-in operation, or a pinch-out operation. For touch operations such as a flick operation, a slide operation, a swipe operation, a pinch-in operation, and a pinch-out operation, the direction in which a touch point moves while in contact with the display section 40 may be limited.

The operation on the preview image AP in the present embodiment includes a slide operation in which a touch point on the sheet image S1$b$ displayed on the left side in the preview image AP moves leftward and a slide operation in which a touch point on the sheet image S2$a$ displayed on the right side in the preview image AP moves rightward. That is, when an operation on the preview image AP like turning a page of an e-book is detected, the display contents of the preview image AP is switched. Thus, the display contents of the preview image AP can be switched as if a page of an e-book is actually turned.

Figure 3:
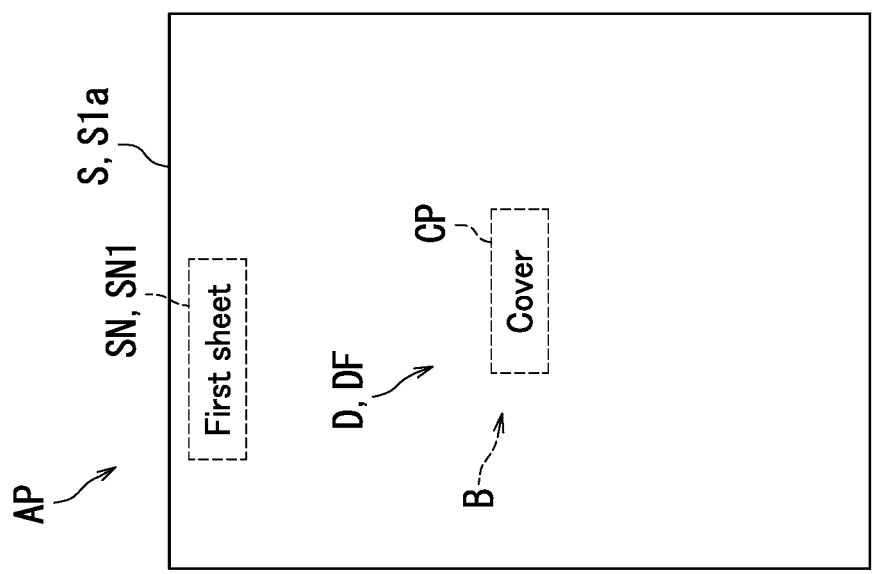
FIG. 3 illustrates the preview image in a state in which a sheet image illustrated in FIG. 2 has been turned.

When an operation on the sheet image S1$b$ of the preview image AP in FIG. 2 is detected, the display section 40 displays the preview image AP wherein the sheet image S1$b$ has been turned. FIG. 3 illustrates the preview image AP wherein the sheet image S1$b$ in FIG. 2 has been turned. The preview image AP wherein the sheet image S1$b$ has been turned includes the sheet image S1$a$, the sheet number image SN1, and an identification image DF. In the present embodiment, the identification image DF includes a main image B. Furthermore, the main image B includes a cover image CP in the present embodiment. The cover image CP means that the displayed sheet image S1$a$ is a cover.

Figure 4:
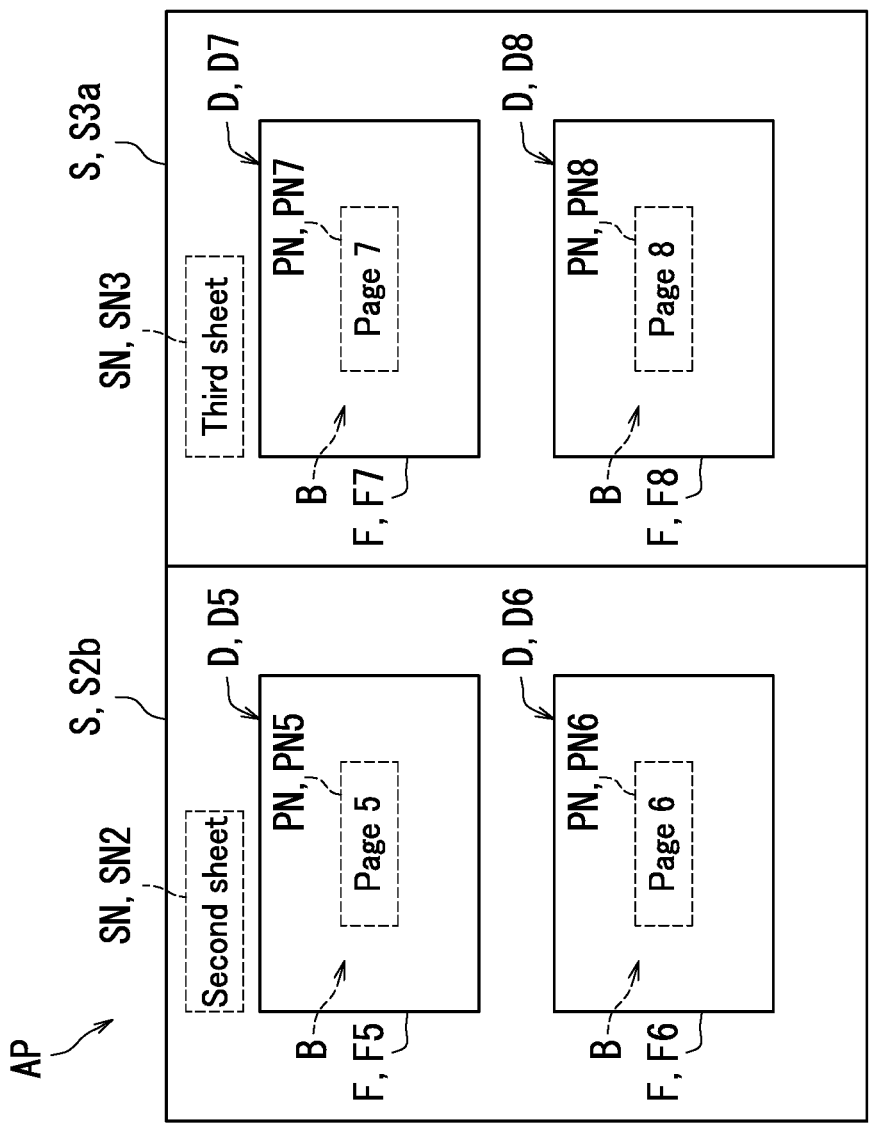
FIG. 4 illustrates the preview image in a state in which the other sheet image illustrated in FIG. 2 has been turned.

By contrast, when an operation on the sheet image S2$a$ of the preview image AP in FIG. 2 is detected, the display section 40 displays the preview image AP wherein the sheet image S2$a$ has been turned. FIG. 4 illustrates the preview image AP wherein the sheet image S2$a$ in FIG. 2 has been turned. The preview image AP wherein the sheet image S2$a$ has been turned includes sheet images S2$b$ and S3$a$, sheet number images SN2 and SN3, and identification images D5 to D8. The sheet image S2$b$ corresponds to the other of the sides of the second sheet of the sheets on which the page images are to be formed. The identification images D5 to D8 include page number images PN5 to PN8, respectively.

When the detecting section 13 detects at least one of: operation on the preview image AP 13 a specific number of times or more; elapse of a specific time period from detection of an operation on the preview image AP; and display of a specific number of identification images D, the display section 40 replaces an identification image D included in the preview image AP with a page image P, and displays the preview image AP. Therefore, such a simple operation can cause display of the preview image AP including the page image P. As a result, the user checking the preview image AP can also check the contents of the page image P by such a simple operation.

FIG. 5 illustrates the preview image AP wherein the identification images D have been replaced by page images P. In the present invention, the specific number of times is twice. As such, when the detecting section 13 detects an operation on the preview image AP twice, the display section 40 replaces identification images D9 to D12 with page images P9 to P12, respectively, and displays the preview image AP. Note that the user is allowed to set the specific number of times to any number.

Furthermore, in a case in which the specific time period is 3 seconds, when 3 seconds elapses after detection of an operation on the preview image AP, the display section 40 may replace the identification images D9 to D12 with the page images P9 to P12, respectively, and display the preview image AP. Furthermore, in a case in which the specific number is 8, when the detecting section 13 detects an operation on the preview image AP after 8 identification images D are displayed, the display section 40 may replace the identification images D9 to D12 with the page images P9 to P12, respectively, and display the preview image AP. Note that the user is allowed to set each of the specific time period and the specific number to any number. Thus, such a simple operation can cause a page image P to be displayed on the preview image AP. As a result, the user checking the preview image AP can also check the contents of the page image P by such a simple operation.

Figure 6:
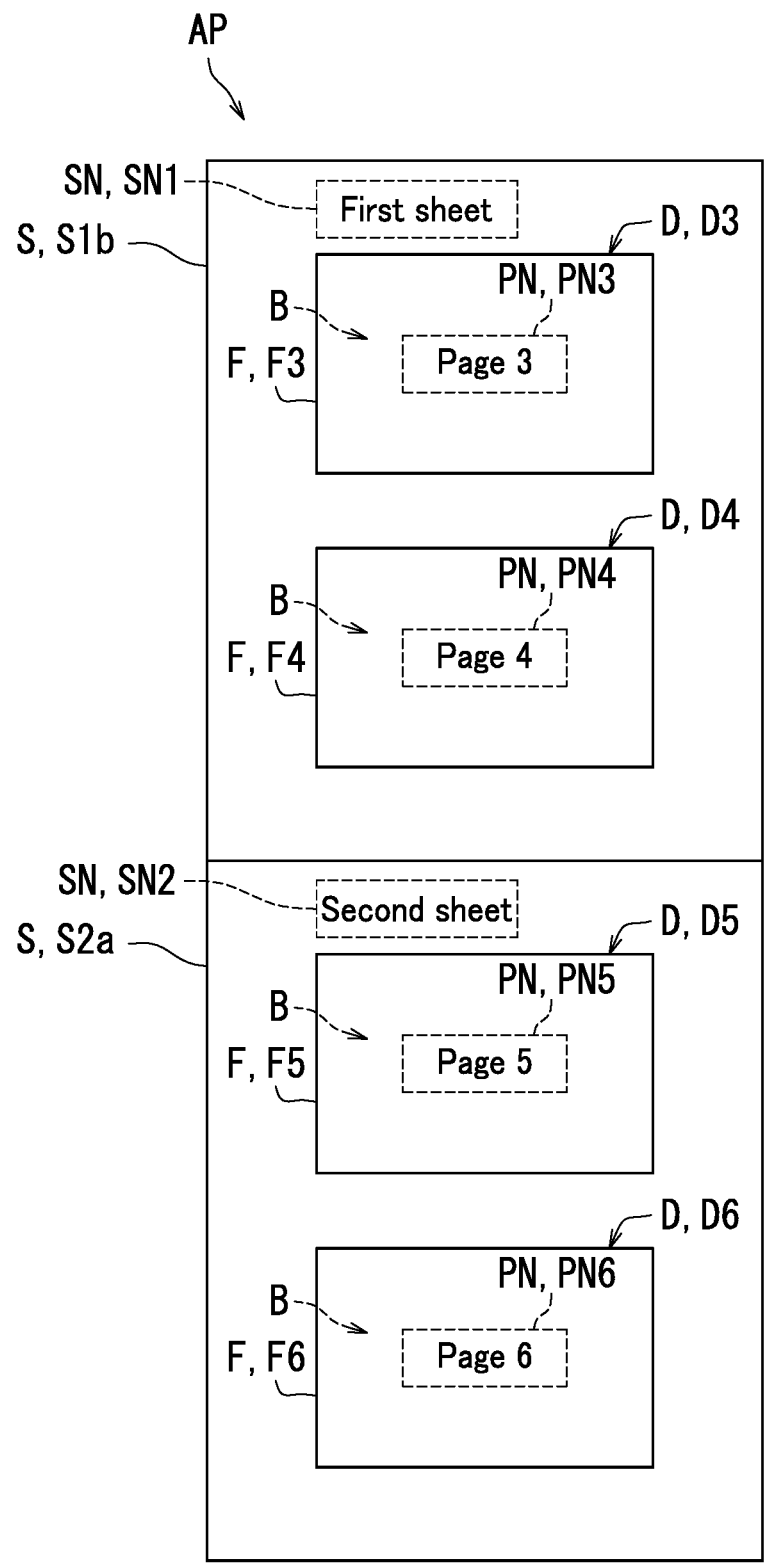
FIG. 6 is a diagram illustrating another example of the preview image generated by the generating section in the first embodiment.
Figure 7:
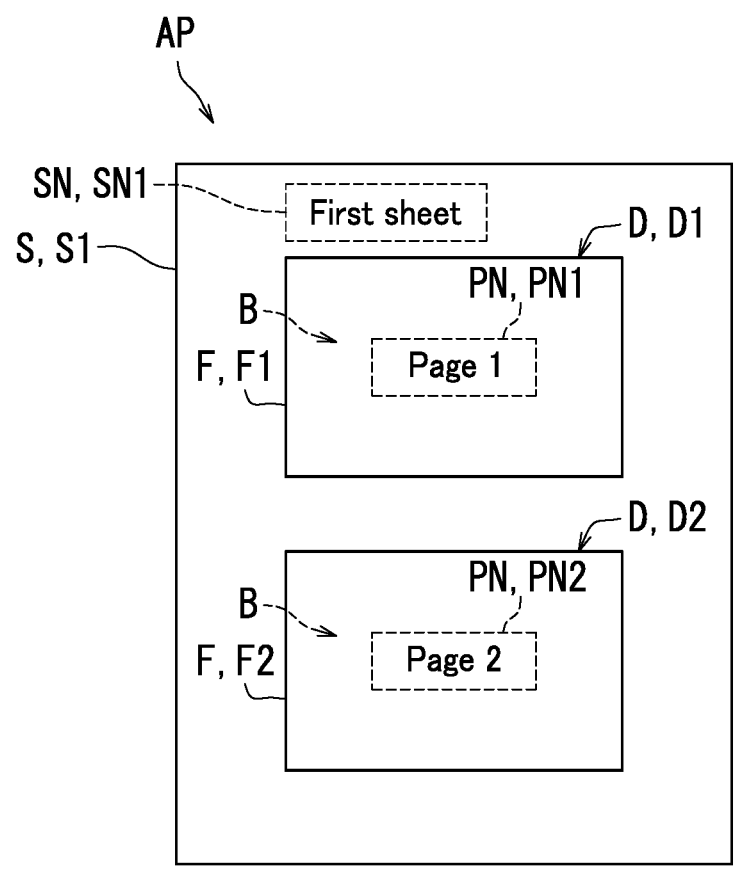
FIG. 7 illustrates the preview image in which a sheet image illustrated in FIG. 6 has been turned.
Figure 8:
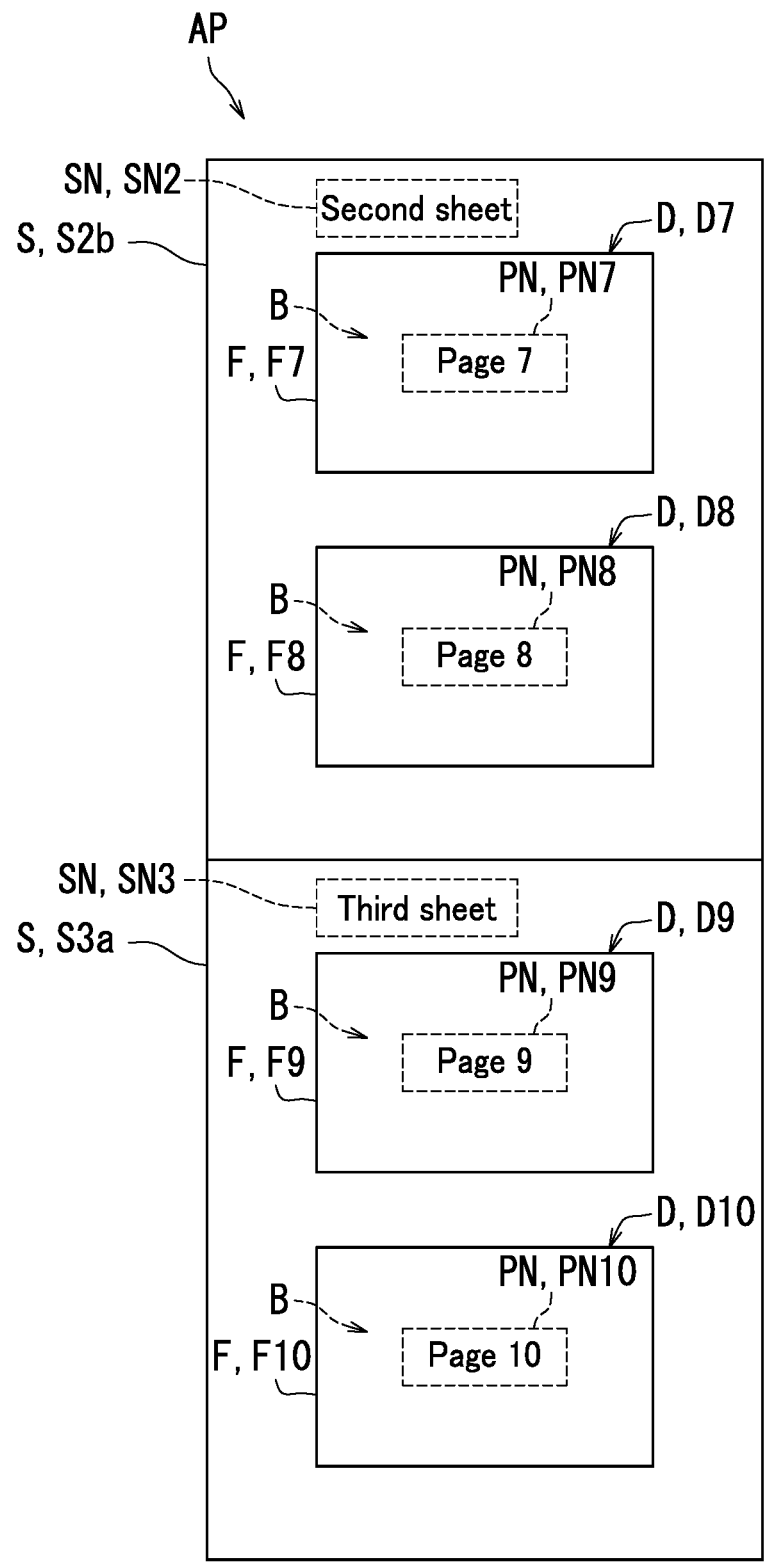
FIG. 8 illustrates the preview image in a state in which the other sheet image illustrated in FIG. 6 has been turned.

The following further describes switching of the display contents of the preview image AP with reference to FIGS. 6 to 8. FIG. 6 is a diagram illustrating another example of the preview image AP. In the present embodiment, there are a plurality of page images. The receiving section 11 receives an arrangement setting by which page images are arranged on each side of each sheet. Furthermore, the receiving section 11 receives the arrangement setting which is a setting by which two page images are arranged on each side of the sheet. Moreover, the receiving section 11 receives the arrangement setting which is a setting by which the page images are arranged such that the sheet is turned with the short side among the short side and the long side of the sheet as an axis. In addition, the receiving section 11 receives the arrangement setting which is a setting by which the page images are arranged such that the sheet is turned upward. That is, the receiving section 11 receives the arrangement setting which is a setting by which the page images are arranged such that the page number of a page image located on the lower side of the preview image AP is greater than the page number of a page image located on the upper side thereof in a case in which the sheets are turned into a spread.

As illustrated in FIG. 6, the preview image AP includes sheet images S1b and S2a, sheet number images SN1 and SN2, and identification images D3 to D6. The operation on the preview image AP in the present embodiment includes a slide operation in which a touch point on the sheet image S1b displayed on the upper side in the preview image AP moves upward and a slide operation in which a touch point on the sheet image S2a displayed on the lower side in the preview image AP moves downward.

When an operation on the sheet image S1b of the preview image AP in FIG. 6 is detected, the display section 40 displays the preview image AP wherein the sheet image S1b has been turned. FIG. 7 illustrates the preview image AP wherein the sheet image S1b in FIG. 6 has been turned. As illustrated in FIG. 7, the preview image AP includes a sheet image S1a, a sheet number image SN1, and identification images D1 and D2. The identification images D1 and D2 each include a main image B and a frame image F. The main images B each include a corresponding one of page number images PN1 and PN2.

When an operation on the sheet image S2a of the preview image AP illustrated in FIG. 6 is detected by contrast, the display section 40 displays the preview image AP wherein the sheet image S2a has been turned. FIG. 8 illustrates the preview image AP wherein the sheet image S2a in FIG. 6 has been turned. As illustrated in FIG. 8, the preview image AP wherein the sheet image S2a has been turned includes sheet images S2b and S3a, sheet number images SN2 and SN3, and identification images D7 to D10. The identification images D7 to D10 include page number images PN7 to PN10, respectively.

Figure 9A:
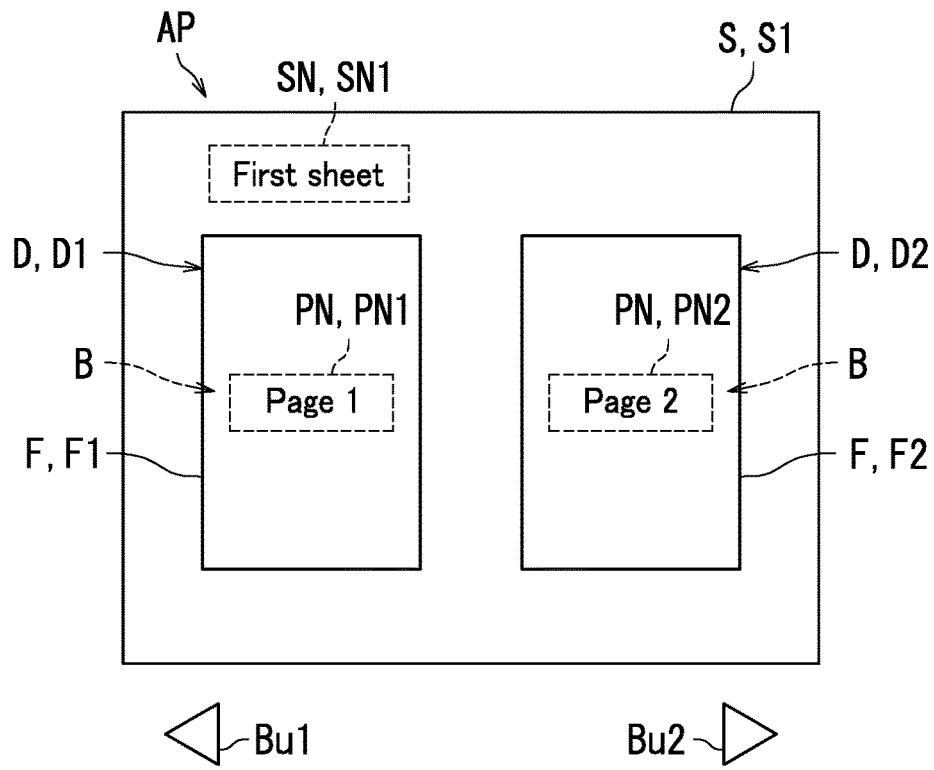
FIG. 9A is a diagram illustrating another example of the preview image.
Figure 9B:
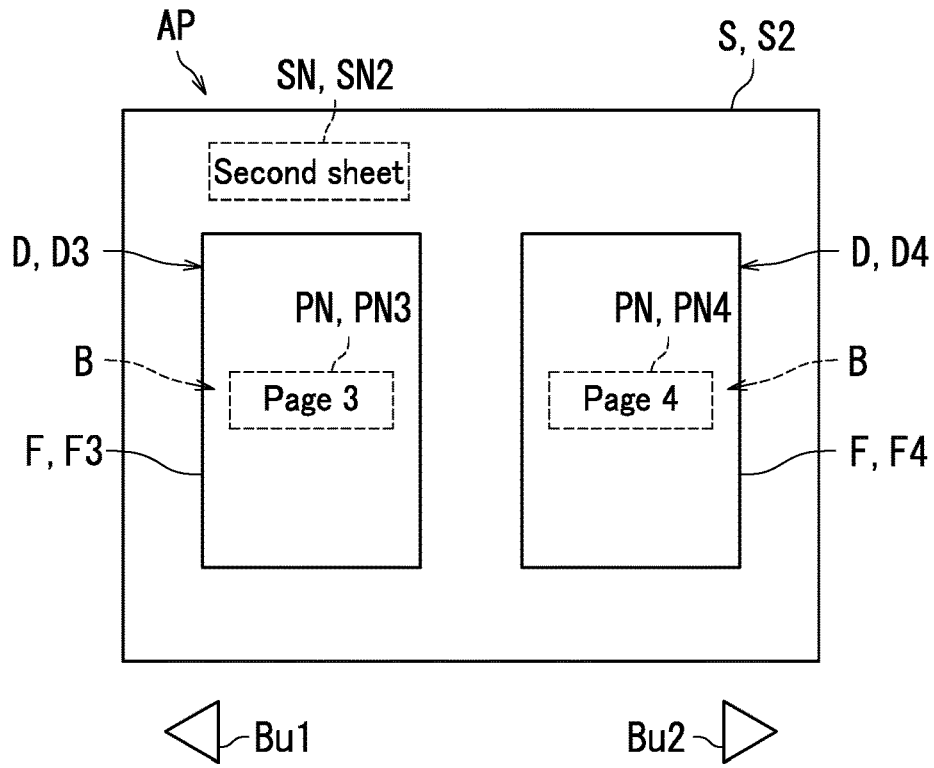
FIG. 9B is a sheet image subsequent to the sheet image illustrated in FIG. 9A.

The following further describes switching of the display contents of the preview image AP with reference to FIGS. 9A and 9B. In the present embodiment, there are a plurality of page images. The receiving section 11 receives an arrangement setting by which page images are arranged on only one side of each sheet. Furthermore, the receiving section 11 receives the arrangement setting which is a setting by which two page images are arranged on the sheet.

FIG. 9A is a diagram illustrating another example of the preview image AP. In a case in which page images are arranged on only one side of the sheet, the display section 40 displays change buttons Bu1 and Bu2 in addition to the preview image AP. The change buttons Bu1 and Bu2 are buttons for changing the currently displayed sheet image(s) S.

When the detecting section 13 detects an operation on the change button Bu2, the display section 40 displays a sheet image S2 subsequent to a sheet image S1. That is, when the detecting section 13 detects an operation on the change button Bu2, the display section 40 displays identification images D3 and D4 which are different from the currently displayed identification images D1 and D2. Note that the sheet image S1 is the first sheet image of the plurality of sheet images S, and therefore the currently displayed sheet image S1 is not changed even upon detection of an operation on the change button Bu1. While the preview image AP including the first sheet image S1 of the sheet images S is displayed, the change button Bu1 may be grayed out to make the user visually aware of the change button Bu1 not being selectable. Also, while the preview image AP including a last sheet image SL of the sheet images S is displayed, the change button Bu2 may be grayed out to make the user visually aware of the change button Bu2 not being selectable.

FIG. 9B illustrates the sheet image S2 subsequent to the sheet image S1 illustrated in FIG. 9A. As illustrated in FIG. 9B, the sheet image S2 includes a sheet number image SN2 and identification images D3 and D4. The identification images D3 and D4 include page number images PN3 and PN4, respectively. When the detecting section 13 detects an operation on the change button Bu1, the display section 40 displays the sheet image S1 previous to the sheet image S2.

Figure 10:
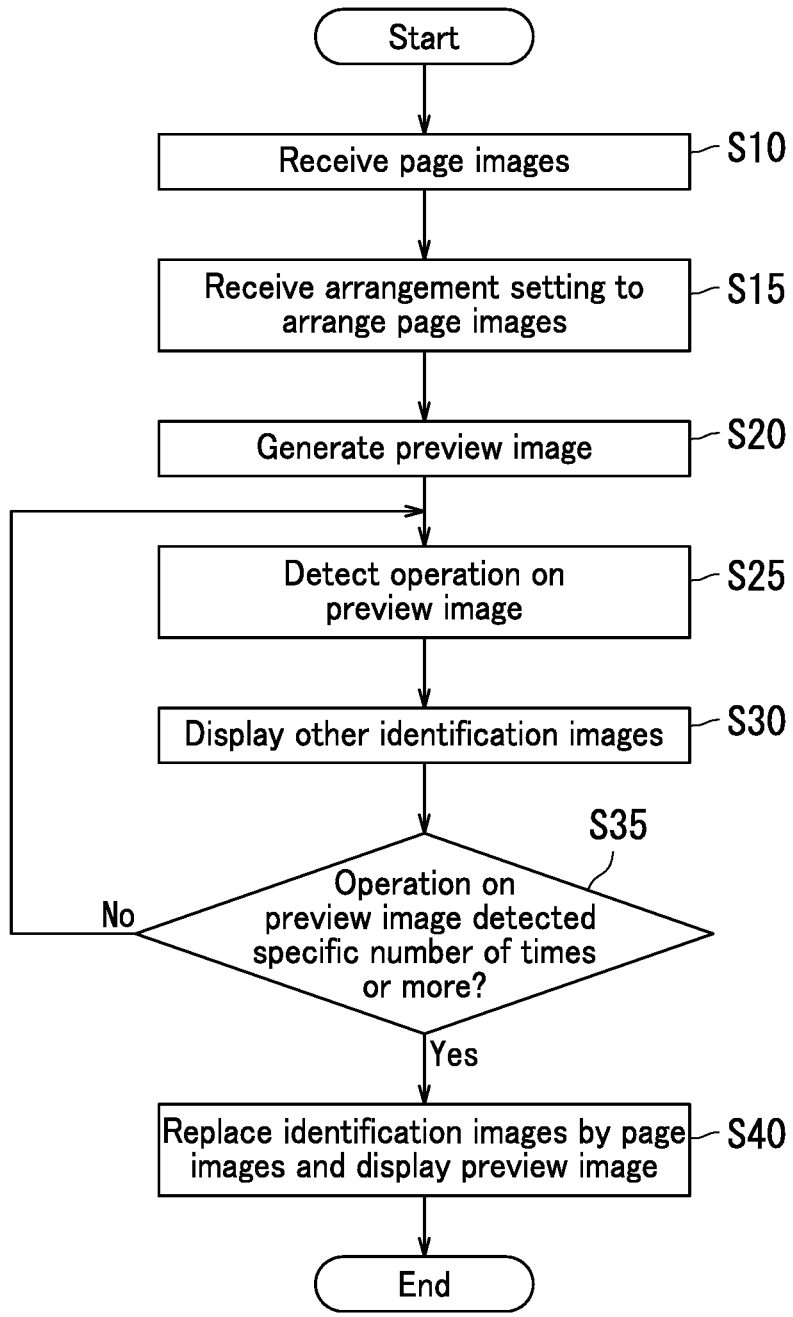
FIG. 10 is a flowchart depicting processing performed by the display device according to the first embodiment.

Description will be made next of processing performed by the display device 1 of the first embodiment with reference to FIG. 10. FIG. 10 is a flowchart depicting the processing performed by the display device 1 of the first embodiment. In Step S10, the receiving section 11 receives page images P. For example, the controller 10 controls the reading section 30 to read images of document sheets. The reading section 30 accordingly reads the images of the document sheets to generate page images P. The receiving section 11 receives the page images P generated by the reading section 30.

Next in Step S15, the receiving section 11 receives an arrangement setting by which the page images P are arranged in formation of the page images P on a sheet. In Step S20, the generating section 12 generates a preview image AP in which the page images P to be formed are arranged on the sheet based on the arrangement setting by which the page images P are arranged received in Step S15 by the receiving section 11.

Next, in Step S25, the detecting section 13 detects an operation on the preview image AP. In Step S30, the controller 10 controls the display section 40 to display identification images D which are different from the currently displayed identification images D. Accordingly, the display section 40 displays the identification images D which are different from the currently displayed identification images D.

In Step S35, the detecting section 13 determines whether or not an operation on the preview image AP has been detected the specific number times or more. If a negative determination is made (NO) in Step S35, the processing returns to Step S25. In Step S25, the detecting section 13 again detects an operation on the preview image AP and the display section 40 displays identification images D which are different from the currently displayed identification images D. If a positive determination is made (YES) by contrast in Step S35, the processing proceeds to Step S40.

In Step S40, the controller 10 controls the display section 40 to display the preview image AP wherein the identification images D included in the preview image AP have been replaced by the page images P. The display section 40 accordingly replaces the identification images D included in the preview image AP with the page images P and displays the preview image AP.

As has been described with reference to FIG. 10, the identification images D are included in the preview image AP in the present embodiment. The identification images D each have a data size smaller than the data size of the corresponding page images P. Accordingly, the preview image AP can be displayed quicker than a preview image AP including the page images P. As a result, the user is allowed to quickly check the arrangement of the page images P to be formed on the sheet.

Furthermore, in the present embodiment, when an operation on the preview image AP is detected the specific number of times or more, the preview image AP wherein an identification image D has been replaced by a page image P is displayed. Therefore, such a simple operation can cause the page image P to be displayed in the preview image AP. As a result, the user checking the preview image AP can also check the contents of the page image P by such a simple operation.

Second Embodiment

Figure 11A:
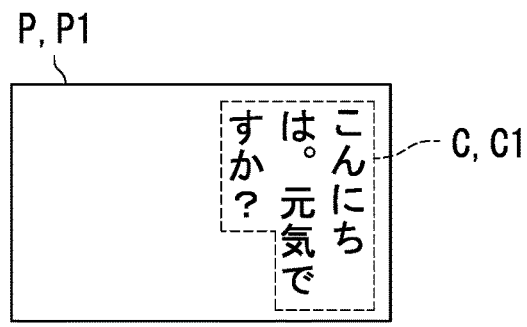
FIG. 11A illustrates a page image in a second embodiment.
Figure 11B:
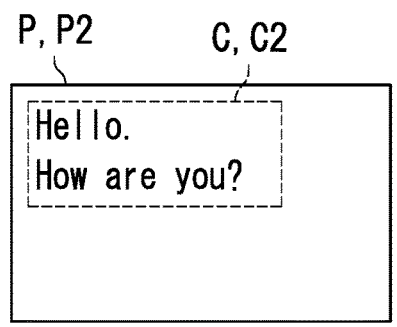
FIG. 11B illustrates a page image in the second embodiment.
Figure 11C:
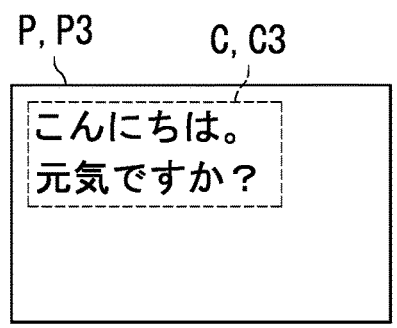
FIG. 11C illustrates a page image in the second embodiment.
Figure 11D:
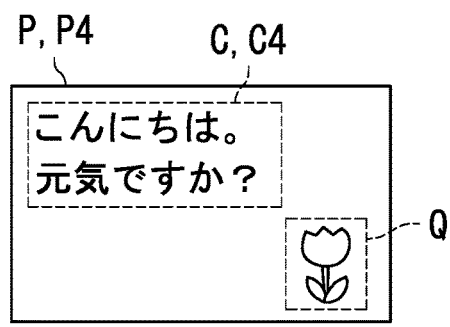
FIG. 11D illustrates a page image in the second embodiment.
Figure 12:
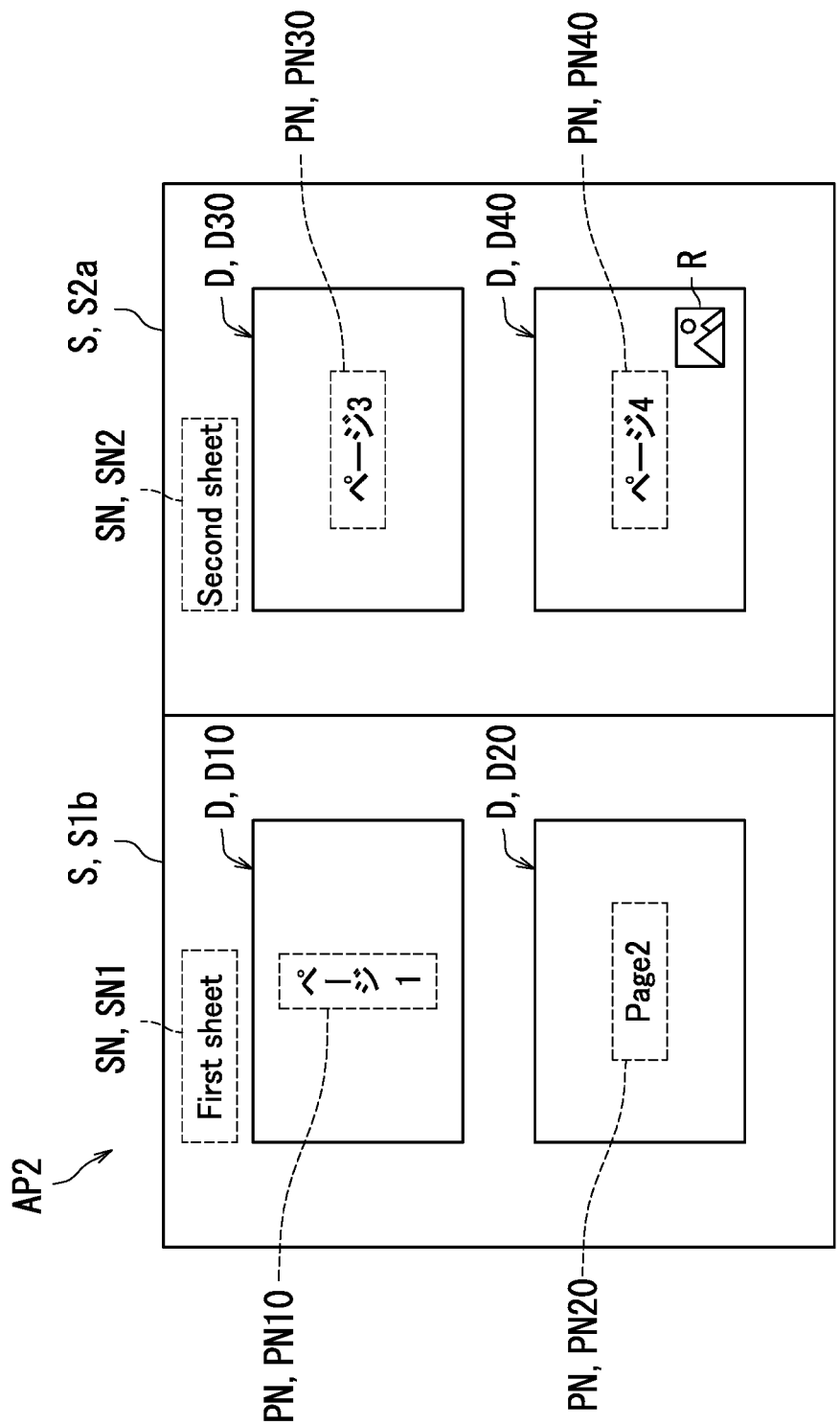
FIG. 12 illustrates a preview image generated by a generating section in the second embodiment.

The following describes a display device 1 according to a second embodiment with reference to FIGS. 1, 11, and 12. The second embodiment differs from the first embodiment in that the page number images PN in the first embodiment are changed according to the contents of the corresponding page images P. In the following, the difference of the second embodiment from the first embodiment will be described and description of parts overlapping with the first embodiment will be omitted.

FIGS. 11A to 11D are diagrams illustrating page images P1 to P4, respectively. FIG. 11A illustrates a page image P1. The page image P1 includes a character string image C1. The character string image C1 includes a plurality of characters. The direction in which the characters included in the character string image C1 are arranged is the vertical direction. Furthermore, the characters included in the character string image C1 include Hiragana characters and Kanji characters. In addition, the page image P1 is a monochrome image.

FIG. 11B illustrates a page image P2. The page image P2 includes a character string image C2. The character string image C2 includes a plurality of characters. The direction in which the characters included in the character string image C2 are arranged is a horizontal direction. Furthermore, the characters included in the character string image C2 include alphabet characters. In addition, the page image P1 is a monochrome image.

FIG. 11C illustrates a page image P3. The page image P3 includes a character string image C3. The character string image C3 includes a plurality of characters. The direction in which the characters included in the character string image C3 are arranged is the horizontal direction. Furthermore, the characters included in the character string image C3 include Hiragana characters and Kanji characters. In addition, the page image P3 is a color image.

FIG. 11D illustrates a page image P4. The page image P4 includes a character string image C4 and a picture Q. The character string image C4 includes a plurality of characters. The direction in which the characters included in the character string image C4 are arranged is the horizontal direction. Furthermore, the characters included in the character string image C4 include Hiragana characters and Kanji characters. Furthermore, the page image P4 is a monochrome image. In the present embodiment, the character string images C1 to C4 will be generally referred to below as "character string images C" when there is no need to distinguish the character string images C1 to C4.

FIG. 12 illustrates a preview image AP generated by the generating section 12 in the second embodiment. The preview image AP includes a plurality of identification images D1 to D4. The identification images D1 to D4 include page number images PN1 to PN4, respectively. As illustrated in FIG. 12, the generating section 12 changes the direction in which characters included in a page number image PN are arranged according to the direction in which the characters included in a character string image C included in a corresponding page image P are arranged. Accordingly, even when the preview image AP is displayed without a page image P, the user can check the direction in which the characters included in a character string image C included in the page image P are arranged by checking a corresponding page number image PN. As a result, the user can easily check the arrangement of the page image P.

Furthermore, the generating section 12 changes the type (s) of the characters included in a page number image PN according to the type(s) of the characters included in a character string image C included in the corresponding page image P. Accordingly, even when the preview image AP is displayed without a page image P, the user can check the type(s) of the characters included in the character string image C1 included in the page image P by checking a corresponding page number image PN. Thus, the user can easily check the arrangement of the page image P.

Moreover, in a case in which a page image P is a color image, the generating section 12 changes the color of the characters included in the corresponding page number image PN to mutually different colors. As such, even when the preview image AP is displayed without a page image P, the user can check whether or not the page image P is a color image by checking the corresponding page number image PN. As a result, the user can easily check the arrangement of the page image P.

Still further, in a case in which a page image P includes a picture Q, the generating section 12 causes a corresponding identification image D to include an icon image R. The icon image R has a data size smaller than the data size of the picture Q. Accordingly, even when the preview image AP is displayed without a page image P, the user can check whether or not a picture Q is included in the page image P by checking the corresponding page number image PN. As a result, the preview image AP can be quickly displayed and the user can easily check the arrangement of the page image P.

Specific description will be made below. The direction in which the characters included in the character string image C1 are arranged in the page image P1 illustrated in FIG. 11A is the vertical direction. As such, the generating section 12 changes the direction in which the characters included in a page number image PN1 of an identification image D1 illustrated in FIG. 12 are arranged to the vertical direction. Furthermore, the characters included in the character string image C1 include Hiragana characters and Kanji characters. As such, the generating section 12 determines that the language represented by the characters included in the character string image C1 is Japanese language, and changes the characters included in the page number image PN1 to characters for corresponding Japanese. In addition, the page image P1 is a monochrome image. As such, the generating section 12 causes display of the characters included in the page number image PN1 in black.

Alternatively, the direction in which the characters included in the character string image C2 are arranged is the horizontal direction in the page image P2 illustrated in FIG. 11B. As such, the generating section 12 changes the direction in which the characters included in the page number image PN2 illustrated in FIG. 12 are arranged to the horizontal direction. Furthermore, the characters included in the character string image C2 are alphabet characters. As such, the generating section 12 determines that the language represented by the characters included in the character string image C2 is English language, and changes the characters included in the page number image PN2 to characters for corresponding English. In addition, the page image P2 is a monochrome image. As such, the generating section 12 causes display of the characters included in the page number image PN2 in black.

Alternatively, the direction in which the characters included in the character string image C3 are arranged is the horizontal direction in the page image P3 illustrated in FIG. 11C. As such, the generating section 12 changes the direction in which the characters included in the page number image PN3 illustrated in FIG. 12 are arranged to the horizontal direction. Furthermore, the characters included in the character string image C3 include Hiragana characters and Kanji characters. As such, the generating section 12 determines that the language represented by the characters included in the character string image C3 is Japanese language, and changes the characters included in the page number image PN3 to characters for corresponding Japanese. In addition, the page image P3 is a color image. As such, the generating section 12 changes the color of the characters included in the page number image PN3 to mutually different colors. For example, the generating section 12 changes, of the characters included in the page number image PN3, the color of the first character to "blue", the color of the second character to "yellow", the color of the third character to "red", and the color of the fourth character to "green".

Moreover, the direction in which the characters included in the character string image C4 are arranged is the horizontal direction in the page image P4 illustrated in FIG. 11D. As such, the generating section 12 changes the direction in which the characters included in the page number image PN4 illustrated in FIG. 12 are arranged to the horizontal direction. Furthermore, the characters included in the character string image C4 include Hiragana characters and Kanji characters. As such, the generating section 12 determines that the language represented by the characters included in the character string image C4 is Japanese language, and changes the characters included in the page number image PN4 to characters for corresponding Japanese. In addition, the page image P4 is a monochrome image. As such, the generating section 12 causes display of the characters included in the page number image PN4 in black. The page image P4 additionally includes the picture Q. As such, the generating section 12 makes the identification image D4 include the icon image R. The icon image R has a data size smaller than the data size of the picture Q.

Here, the icon image R is a display device icon image for display device use pre-stored in the display device 1 or a processed image obtained by processing the display device icon image. In the preview image AP, the icon image R is displayed at a location corresponding to the location of the picture Q in the page image P4, for example. Additionally, the icon image R may be displayed at a location in the preview image AP corresponding to the location of the picture Q in the page image P4 with the size of the icon image R kept as it is, for example. In this case, a frame image for the picture Q may be displayed that indicates a printing range of the picture Q to be formed on a sheet. In addition, the icon image R may be displayed in an increased size or a reduced size in the preview image AP to indicate the printing range of the picture Q to be formed on a sheet, for example. In this case, the frame image for the picture Q indicating the printing range of the picture Q may be displayed or may not be displayed.

Embodiments of the present invention have been described so far with reference to the drawings (FIGS. 1 to 12). However, the present invention is not limited to the above embodiments and may be implemented in various different forms that do not deviate from the essence of the present invention (for example, as described below in sections (1) and (6)). The drawings schematically illustrate elements of configuration in order to facilitate understanding. Aspects of the elements of configuration illustrated in the drawings, such as thickness, length, and quantity, may differ from reality in order to aid preparation of the drawings. Furthermore, properties of the elements of configuration described in the above embodiments, such as shapes and dimensions, are merely examples and are not intended as specific limitations. Various alterations may be made so long as there is no substantial deviation from the effects of the present invention.

(1) As described with reference to FIG. 2, the operation on the preview image AP is a touch operation of touch on the preview image AP displayed on the display section 40, for example. However, the operation on the preview image AP may be a clicking operation on the preview image AP using a pointing device such as a mouse.

(2) As described with reference to FIGS. 2 to 8, when the detecting section 13 detects an operation on the preview image AP in page image formation on both sides of a sheet, the display section 40 displays sheet images S which are different from the currently displayed sheet images S. However, even in page image formation on both sides of a sheet, the change buttons Bu1 and Bu2 may be displayed. In this case, the display section 40 may display sheet images S which are different from the currently displayed sheet images S when the detecting section 13 detects an operation on either of the change buttons Bu1 and Bu2.

(3) As described with reference to FIGS. 9A and 9B, the change buttons Bu1 and Bu2 are displayed in page image formation on only one side of a sheet. As such, when the detecting section 13 detects an operation on either of the change buttons Bu1 and Bu2, the display section 40 displays sheet images S which are different from the currently displayed sheet images S. However, the display section 40 may display sheet images S which are different from the currently displayed sheet images S when the detecting section 13 detects an operation on the preview image AP.

(4) As described with reference to FIGS. 2 and 6, in formation of page images on each side of the sheets, the display section 40 first displays the preview image AP including the sheet image S1b that corresponds to the first sheet of the sheets on which the page images are to be formed. However, the display section 40 may first display the preview image AP including the sheet image Sla that corresponds to the first sheet of the sheets on which the page images are to be formed. Alternatively, the display section 40 may first display the preview image AP including a sheet image SLb that corresponds to the last sheet of the sheets on which the page images are to be formed.

(5) As described with reference to FIGS. 11 and 12, the generating section 12 changes the direction in which the characters included in a page number image PN are arranged according to the direction in which the characters included in the corresponding character string image C included in a page image P are arranged. However, in a case in which the page image P includes no character string image C, the generating section 12 changes the direction in which the characters included in the page number image PN are arranged to a preset direction. The user is allowed to set the preset direction to any direction. For example, the preset direction is the horizontal direction.

(6) As described with reference to FIGS. 11 and 12, the generating section 12 changes the type(s) of the characters included in a page number image PN according to the type(s) of the characters included in the corresponding character string image C included in a page image P. However, in a case in which a page image P includes no character string image C, the generating section 12 changes the type(s) of the characters included in the corresponding page number image PN to the type(s) according to the language set in the display device 1. In a case in which the language set in the display device 1 is Japanese language, for example, the generating section 12 changes the characters included in the page number image PN to at least one of a Hiragana character, a Katakana character, a Kanji character, and a numeral corresponding to Japanese.

INDUSTRIAL APPLICABILITY

The present invention is usable in the fields of display devices and has industrial applicability.

The invention claimed is:

1. A display device comprising:
a receiving section configured to receive an arrangement setting, the arrangement setting being a setting by which a page image is arranged in formation of the page image on a sheet;
a generating section configured to generate based on the arrangement setting a preview image in which an identification image identifying the page image is arranged; and
a display section configured to display the preview image, wherein
a location of the identification image in the preview image indicates a location of the page image when the page image is formed on the sheet,
the identification image has a data size smaller than a data size of the page image,
the identification image includes a page number image indicating a page number of the page image,
the page image includes a character string image including a plurality of characters,
the page number image includes a plurality of characters, and
the generating section changes a direction in which the characters included in the page number image are arranged according to a direction in which the characters included in the character string image are arranged.

2. The display device according to claim 1, wherein
the identification image is an image which is different from a reduced-size image of the page image, the reduced-size image being the page image reduced in size, and
the data size of the identification image is smaller than a data size of the reduced-size image.

3. The display device according to claim 1, wherein
in a case in which the page image includes a picture, the generating section causes the identification image to include an icon image, and
the icon image has a data size smaller than a data size of the picture.

4. The display device according to claim 3, wherein
the icon image is a display device icon image pre-stored in the display device or a processed image obtained by processing the display device icon image.

5. A display device comprising:
a receiving section configured to receive an arrangement setting, the arrangement setting being a setting by which a page image is arranged in formation of the page image on a sheet;
a generating section configured to generate based on the arrangement setting a preview image in which an identification image identifying the page image is arranged; and
a display section configured to display the preview image, wherein
a location of the identification image in the preview image indicates a location of the page image when the page image is formed on the sheet,
the identification image has a data size smaller than a data size of the page image,
the identification image includes a page number image indicating a page number of the page image,
the page image includes a character string image including a plurality of characters,
the page number image includes a plurality of characters, and
the generating section changes a type of the characters included in the page number image according to a type of the characters included in the character string image.

6. A display device comprising:
a receiving section configured to receive an arrangement setting, the arrangement setting being a setting by which a page image is arranged in formation of the page image on a sheet;
a generating section configured to generate based on the arrangement setting a preview image in which an identification image identifying the page image is arranged;
a display section configured to display the preview image; and
a detecting section configured to detect an operation on the preview image displayed on the display section, wherein a location of the identification image in the preview image indicates a location of the page image when the page image is formed on the sheet, the identification image has a data size smaller than a data size of the page image, the page image includes a plurality of page images, the identification image includes a plurality of identification images, when the detecting section detects the operation on the preview image, the display section displays an identification image of the identification images which is different from a currently displayed identification image of the identification images, and when the detecting section detects at least one of: the operation on the preview image a specific number of times or more; elapse of a specific time period from detection of the operation on the preview image; and display of a specific number of preview images, the display section replaces the identification image included in the preview image with the page image.

* * * * *